(12) United States Patent
Kurita et al.

(10) Patent No.: US 6,941,571 B2
(45) Date of Patent: Sep. 6, 2005

(54) RECORDING AND/OR REPRODUCING DEVICE

(75) Inventors: Kazuhito Kurita, Kanagawa (JP); Kazutaka Noborimoto, Kanagawa (JP); Norimasa Matsuo, Kanagawa (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 10/311,603

(22) PCT Filed: Apr. 19, 2002

(86) PCT No.: PCT/JP02/03960
§ 371 (c)(1),
(2), (4) Date: Dec. 18, 2002

(87) PCT Pub. No.: WO02/086891
PCT Pub. Date: Oct. 31, 2002

(65) Prior Publication Data
US 2003/0142617 A1 Jul. 31, 2003

(30) Foreign Application Priority Data
Dec. 12, 2001 (JP) .......................................... 2001-379079
Apr. 20, 2002 (JP) .......................................... 2001-123542

(51) Int. Cl.$^7$ .............................................. G11B 7/00
(52) U.S. Cl. ............................................ 720/718
(58) Field of Search ................................. 720/659, 661, 720/662, 663, 681, 664, 669, 674, 675, 676, 677, 678

(56) References Cited

U.S. PATENT DOCUMENTS

| 5,225,941 A | * | 7/1993 | Saito et al. .................. 359/824 |
| 5,511,062 A | * | 4/1996 | Schoneveld et al. ........ 720/673 |
| 5,757,761 A | | 5/1998 | Menke et al. |
| 6,741,525 B2 | * | 5/2004 | Kurita et al. ............. 369/13.12 |
| 2003/0012118 A1 | * | 1/2003 | Su et al. ..................... 369/223 |
| 2003/0128456 A1 | | 7/2003 | Shitara et al. |

FOREIGN PATENT DOCUMENTS

| JP | 9-115148 | 5/1997 |
| JP | 11-102579 | 4/1999 |

OTHER PUBLICATIONS

Patent Abstracts of Japan, JP 11–144295, May 28, 1999.
Patent Abstracts of Japan, JP 11–161969, Jun. 18, 1999.
Patent Abstracts of Japan, JP 2000–030262, Jan. 28, 2000.

* cited by examiner

Primary Examiner—A. J. Heinz
Assistant Examiner—Mark Blouin
(74) Attorney, Agent, or Firm—Oblon, Spivak, McClelland, Maier & Neustadt, P.C.

(57) ABSTRACT

The present invention provides a recording and/or reproducing apparatus using a magneto-optical disc (3) as a recording medium, which includes a recording and/or reproducing mechanism (7) for recording and reproducing information signals to and from the magneto-optical disc (3) rotatably housed in a disc cartridge (2), a support base (19) which supports the recording and/or reproducing mechanism (7), and a impact drive mechanism (9) which causes the electromechanical-transduction element (25) to lengthen and shorten corresponding to driving pulses to shift the drive shaft (24) along the shaft direction thereof so as to cause the movable portion (27) to slide along the shaft direction of the drive shaft (24) together with the support base (19), and the recording and/or reproducing mechanism (7) and the impact drive mechanism (9) are arranged within a projection area of the openings (4a), (4b) of the disc cartridge (2) for exposing a part of the magneto-optical disc (3) to the outside from the inner to the outer circumference thereof

14 Claims, 8 Drawing Sheets

PRIOR ART

PRIOR ART

RECORDING AND/OR REPRODUCING DEVICE

TECHNICAL FIELD

The present invention relates to a recording and/or reproducing apparatus for recording information signals to a disc-shaped recording medium such as an optical disc or a magneto-optical disc, and for reproducing information signals recorded on such a disc-shaped recording medium.

BACKGROUND ART

There are used recording and/or reproducing apparatuses which record information signals to a disc-shaped recording medium. As a disc-shaped recording medium used in this kind of recording and/or reproducing apparatuses, there are optical discs such as a CD (Compact Disc), a CD-R (CD-Recordable), a CD-RW (CD-ReWritable), a DVD (Digital Versatile Disc), and an MD (Mini Disc) being a magneto-optical disc which is 64 mm in diameter.

The recording and/or reproducing apparatuses using various kinds of disc-shaped recording media, which have been described above, have a recording and/or reproducing unit which corresponds to a disc-shaped recording medium to be used.

Figure 1:
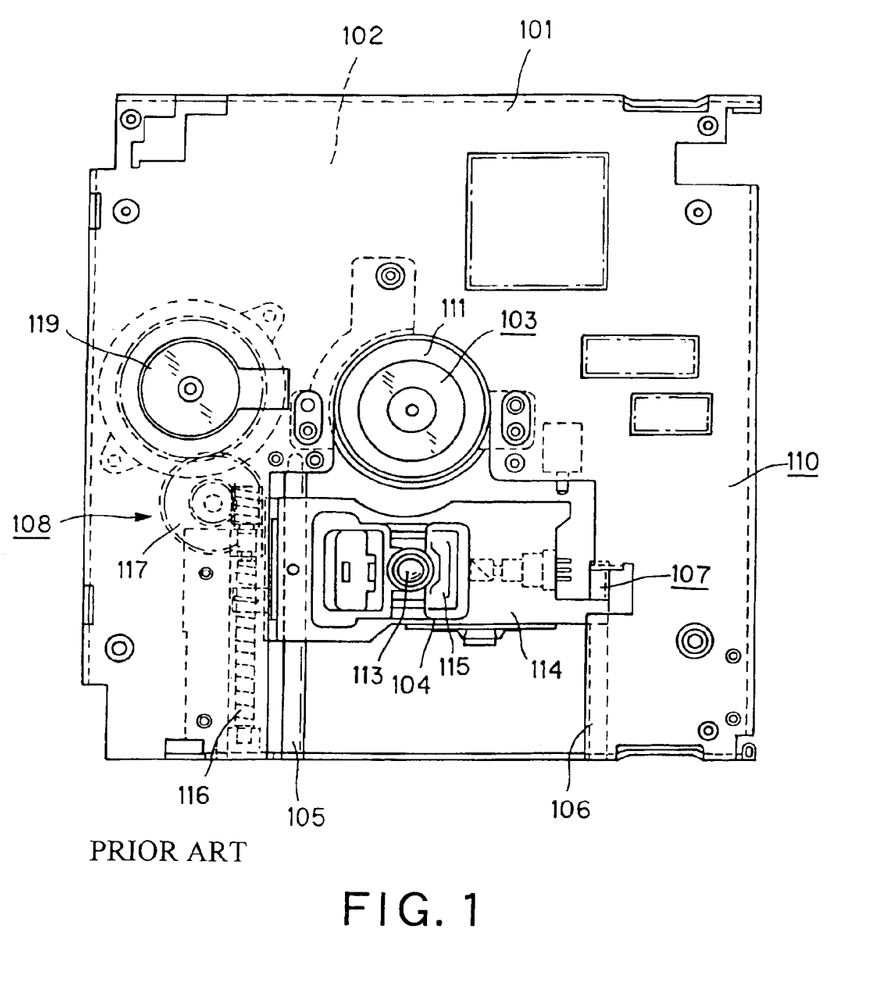
FIG. 1 shows a plan view of the conventional disc player.
Figure 2:
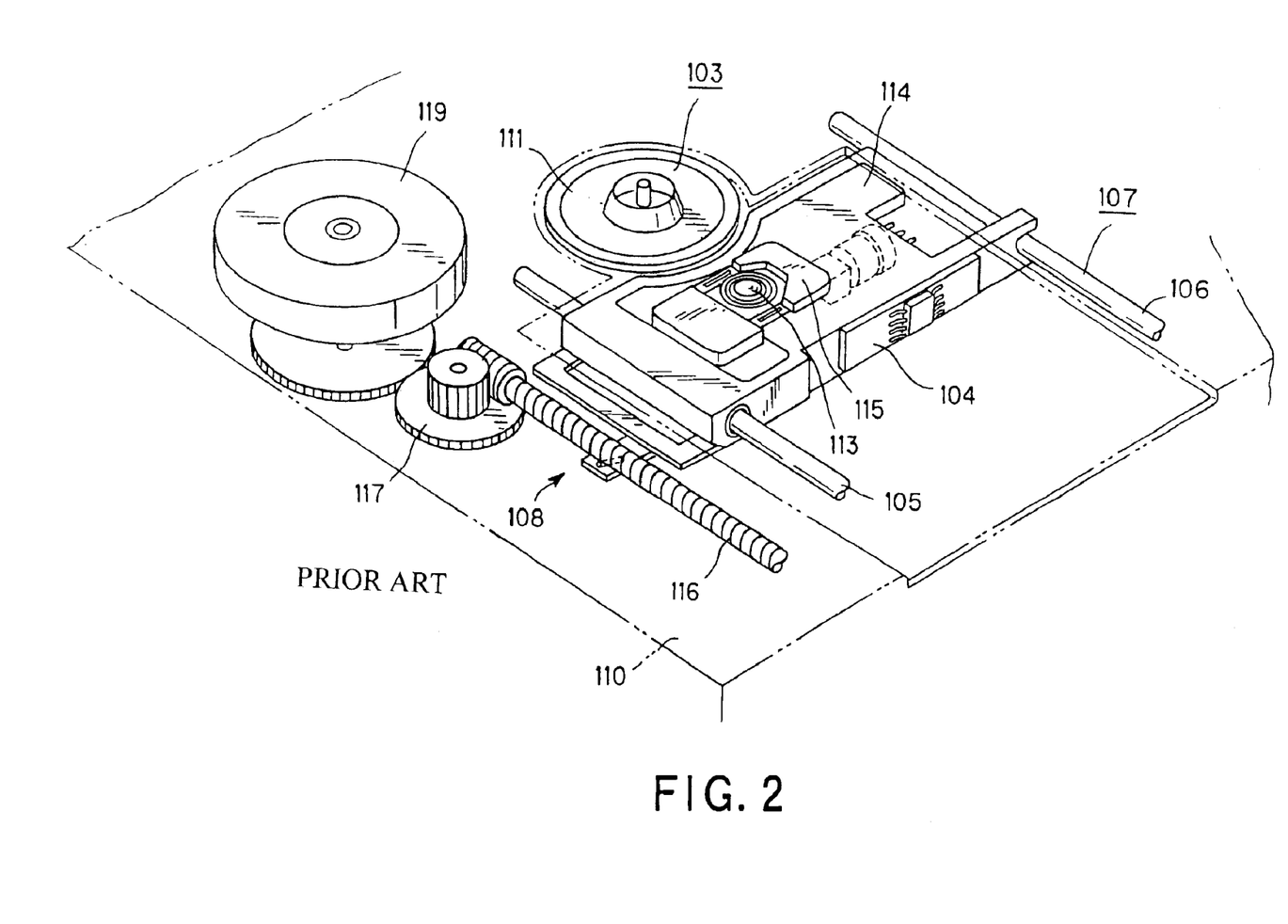
FIG. 2 shows a perspective view of the conventional disc player.

A disc player which uses an optical disc of an MD as a recording medium includes a disc rotation drive mechanism 103 for driving or rotating an optical disc 102 housed in a disc cartridge 101, an optical pickup 104 for reproducing information signals from the optical disc 102 driven by the disc rotation drive mechanism 103, a support mechanism 107 having a pair of guide axes 105, 106 for movably supporting the optical pickup 104 along the radial direction of the optical disc 102, and a pickup shift mechanism 108 for shifting the optical pickup 104 supported by the support mechanism 107 along the radial direction of the optical disc 102, as shown in FIG. 1 and FIG. 2. The respective mechanisms are arranged in a mechanism chassis or a mecha-chassis 110 arranged in the disc player body, as shown in FIG. 1 and FIG. 2.

Figure 3:
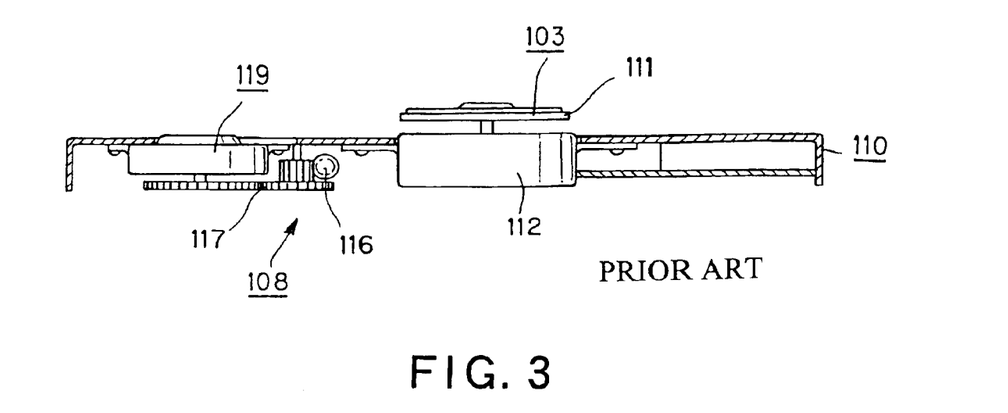
FIG. 3 shows a side view of the conventional disc player.

The disc rotation drive mechanism 103, which drives the optical disc 102, has a disc table 111 onto which the optical disc 102 is placed, and a spindle motor 112 for driving or rotating the disc table 111, as shown in FIG. 3. The optical pickup 104 has an optical block 114 for condensing an optical beam emitted from a light source using an objective lens 113 and irradiating thus condensed optical beam to the signal recording surface of the optical disc 102, and for receiving a returning optical beam reflected by the signal recording surface of the optical disc 102 using a photodetector, and a biaxial actuator 115 for shifting the objective lens 113 along the focusing direction parallel to the optical axis of the objective lens 113 as well as along the tracking direction perpendicular to the optical axis of the objective lens 113 based on detection signals detected by the photodetector. The support mechanism 107 has the guide axes 105, 106 for movably supporting the optical block 114 of the optical pickup 104 along the radial direction of the optical disc 102. The pickup shift mechanism 108 has a lead screw 116, a gear group 117 consisting of a plurality of gears, and a shift motor 119 for shifting the optical pickup 104, which are arranged on the mecha-chassis 110. The shift motor 119 drives or rotates the gear group 117 to rotate the lead screw 116 engaged with the gear group 117 so as to shift the optical pickup 104 which has an engagement pin 118 engaged with the lead screw 116, with the optical block 114 guided by the guide axes 105, 106.

With thus configured disc player, when the optical disc 102 is driven by the disc rotation drive mechanism 103, the optical pickup 104 supported by the support mechanism 107 is shifted by the pickup shift mechanism 108 along the radial direction of the optical disc 102, while the optical pickup 104 irradiates an optical beam to the signal recording surface of the optical disc 102 to scan the signal recording area thereof. Then, the photodetector of the optical pickup 104 detects a returning optical beam reflected by the signal recording surface of the optical disc 102 to read information signals recorded on the optical disc 102.

In the conventional disc player, the pickup shift mechanism 108, which shifts the optical pickup 104 along the radial direction of the optical disc 102, generally converts rotational driving force of the shift motor 119 to linear driving force by means of the gear group 117 and the lead screw 116. Therefore, in thus configured disc player, the number of parts or components are inevitably increased, which raises various problems. Specifically, space for arranging the shift motor 119, gear group 117, etc. is required to be prepared, which makes it difficult to further reduce the disc player in size. Since the number of parts is increased, undesirably, cost required for those parts is caused to be high as well as the number of steps in the assembling process is caused to be increased. Moreover, since rotational driving force is converted to linear driving force, conversion efficiency is low, which undesirably requires large power consumption. Furthermore, the problem of noise due to the shift motor 119, gear group 117, lead screw 116, etc. has been pointed out.

Especially, as shown in FIG. 1 and FIG. 2, in the disc player which employs the shift motor 119 and the gear mechanism for transmitting rotational driving force of the shift motor 119 to linear driving force to shift the optical pickup 104, it is necessary that a plenty of parts be arranged on the mecha-chassis 110. Thus, a wide area of the mecha-chassis 110 is used to arrange the mechanism for operating the optical pickup 104. In result, mechanisms and the number of parts to be arranged on the mecha-chassis 110 are restricted. Mechanisms and parts which cannot be arranged on the mecha-chassis 110 have to be arranged on other region of the main body of disc player, which also makes it difficult to reduce the disc player in size.

Furthermore, the pickup shift mechanism 108, which has the shift motor 119 for shifting the optical pickup 104, becomes comparatively thick, which should be taken into consideration to reduce the thickness of the disc player itself.

There is also used a disc player which uses, as a shift motor for shifting an optical pickup, a linear drive motor which performs linearly driving instead of using a rotational drive motor. However, it is difficult to adopt such a disc player to a portable type disc player since driving power is increased and its optical pickup has difficulty in keeping itself at constant positions when the operation is stopped.

A disc player performs, using a biaxial actuator, the focusing control to bring a focal point of an objective lens to the signal recording surface of an optical disc while shifting the objective lens along the focusing direction parallel to the optical axis of the objective lens, and the tracking control to bring a beam spot of an optical beam condensed by the objective lens to recording tracks of the optical disc while shifting the objective lens along the tracking direction perpendicular to the optical axis of the objective lens. A biaxial actuator for performing the focusing control and the tracking control used in the conventional disc player is complicated in its configuration and takes time in assembling parts thereof, which leads to high manufacturing cost.

Furthermore, in the conventional disc player, when the optical pickup is shifted along the radial direction of the optical disc, the position of a beam spot of an optical beam to be received by a photodetector is deviated since the objective lens swings along the radial direction of the optical disc. Thus, there is undesirably generated offset in detection signals. Also, when the objective lens is caused to swing, a skew of the object lens itself is generated, which may deteriorate detection signals.

Thus, it is necessary for the conventional disc player to correct detection signals in view of the offset due to the swinging of the objective lens, which may complicate the mechanism for performing the tacking control. Furthermore, power to keep the view direction of the object lens constant is necessary, which may require power consumption.

DISCLOSURE OF THE INVENTION

Accordingly, the present invention has an object to overcome the above-mentioned drawbacks of the prior art by providing a new recording and/or reproducing apparatus which can solve the above-described problems raised in the conventional recording and/or reproducing apparatus.

Furthermore, the present invention has another object to provide a recording and/or reproducing apparatus which can be reduced in size and requires less power consumption.

Furthermore, the present invention has another object to provide a recording and/or reproducing apparatus which is simplified in configuration and can reduce manufacturing cost.

The above object can be attained by providing a reproducing apparatus, including:

a reproduction means for reproducing signals recorded on a disc recording medium which is rotatably housed in a disc cartridge;

a support means for movably supporting the reproduction means along the radial direction of the disc recording medium, the support means having a support base which supports the reproduction means; and a drive means having a movable portion arranged at the support base, a drive shaft for slidably supporting the movable portion along the radial direction of the disc recording medium, and an electromechanical-transduction element installed to one end of the drive shaft, which lengthens and shortens along the shaft direction of the drive shaft corresponding to driving pulses, the drive means causing the electromechanical-transduction element to lengthen and shorten corresponding to the driving pulses to shift the drive shaft along the shaft direction thereof so as to cause the movable portion to slide along the shaft direction of the drive shaft;

wherein the reproduction means and the drive means are arranged within a projection area of openings of the disc cartridge for exposing a part of the disc recording medium to the outside from the inner to the outer circumference thereof.

In thus configured reproducing apparatus according to the present invention, when the drive means causes the movable portion to slide along the shaft direction of the drive shaft, the support base can be properly shifted along the radial direction of the disc recording medium. Since the reproduction means and the drive means are arranged within a projection area of openings of the disc cartridge for exposing a part of the disc recording medium to the outside from the inner to the outer circumference thereof, part of the reproduction means and the drive means can be arranged within the disc cartridge via the openings. Thus, the reproducing apparatus can be further reduced in thickness and size as compared with the conventional reproducing apparatus.

Furthermore, since the drive means performs the shift operation of shifting the optical pickup from the inner to the outer circumference of the disc recording medium, and the tracking operation of bringing a beam spot of an optical beam irradiated by the optical pickup to recording tracks of the disc recording medium, the configuration of the reproducing apparatus can be simplified as compared with the conventional reproducing apparatus.

Also, the above object can be attained by providing a recording and/or reproducing apparatus, including:

a record and reproduction means for recording/reproducing signals to/from a disc recording medium which is rotatably housed in a disc cartridge;

a support means for movably supporting the record and reproduction means along the radial direction of the disc recording medium, the support means having a support base which supports the record and reproduction means; and a drive means having a movable portion arranged at the support base, a drive shaft for slidably supporting the movable portion along the radial direction of the disc recording medium, and an electromechanical-transduction element installed to one end of the drive shaft, which lengthens and shortens along the shaft direction of the drive shaft corresponding to driving pulses, the drive means causing the electromechanical-transduction element to lengthen and shorten corresponding to the driving pulses to shift the drive shaft along the shaft direction thereof so as to cause the movable portion to slide along the shaft direction of the drive shaft;

wherein the record and reproduction means and the drive means are arranged within a projection area of openings of the disc cartridge for exposing a part of the disc recording medium to the outside from the inner to the outer circumference thereof.

Thus, the recording and/or reproducing apparatus can be further reduced in thickness and size.

Also, the above object can be attained by providing a reproducing apparatus which has loaded thereto a disc cartridge for housing a disc recording medium, which is provided with openings for exposing at least a part of the disc recording medium to the outside from the inner to the outer circumference thereof, and reproduces data recorded on the disc recording medium via the openings of the disc cartridge, the reproducing apparatus including:

a reproduction means which has a read out means for reading out data recorded on the disc recording medium housed in the disc cartridge, and a drive means for shifting the read out means to predetermined positions against the disc recording medium;

wherein the reproduction means is so formed as to be smaller than a projection area of the openings of the disc cartridge.

The drive means has a drive shaft means engaged with the read out means by friction, and an oscillation means for shifting the drive shaft means along the movement direction of the read out means. The oscillation means oscillates so that the velocity of the drive shaft means along one direction is different from that along the other direction.

The disc recording medium is an optical disc, and the read out means is an optical pickup which has an irradiation means for irradiating an optical beam to the disc recording medium, and a photo detection means for detecting a returning optical beam reflected by the signal recording surface of the disc recording medium.

These objects and other objects, features and advantages of the present invention will become more apparent from the following detailed description of the preferred embodiments of the present invention.

BRIEF DESCRIPTION OF THE DRAWINGS

FIG. 7 shows wave forms of driving pulses to be applied to an electromechanical-transduction element, and FIG. 7A shows a wave form used in shifting a support base along the "A" direction of FIG. 4, while

BEST MODE FOR CARRYING OUT THE INVENTION

The present invention, which is employed in a recording and/or reproducing apparatus using a disc cartridge having a magneto-optical disc being a disc-shaped recording medium rotatably housed therein, will further be described below concerning the best modes with reference to the accompanying drawings.

Figure 4:
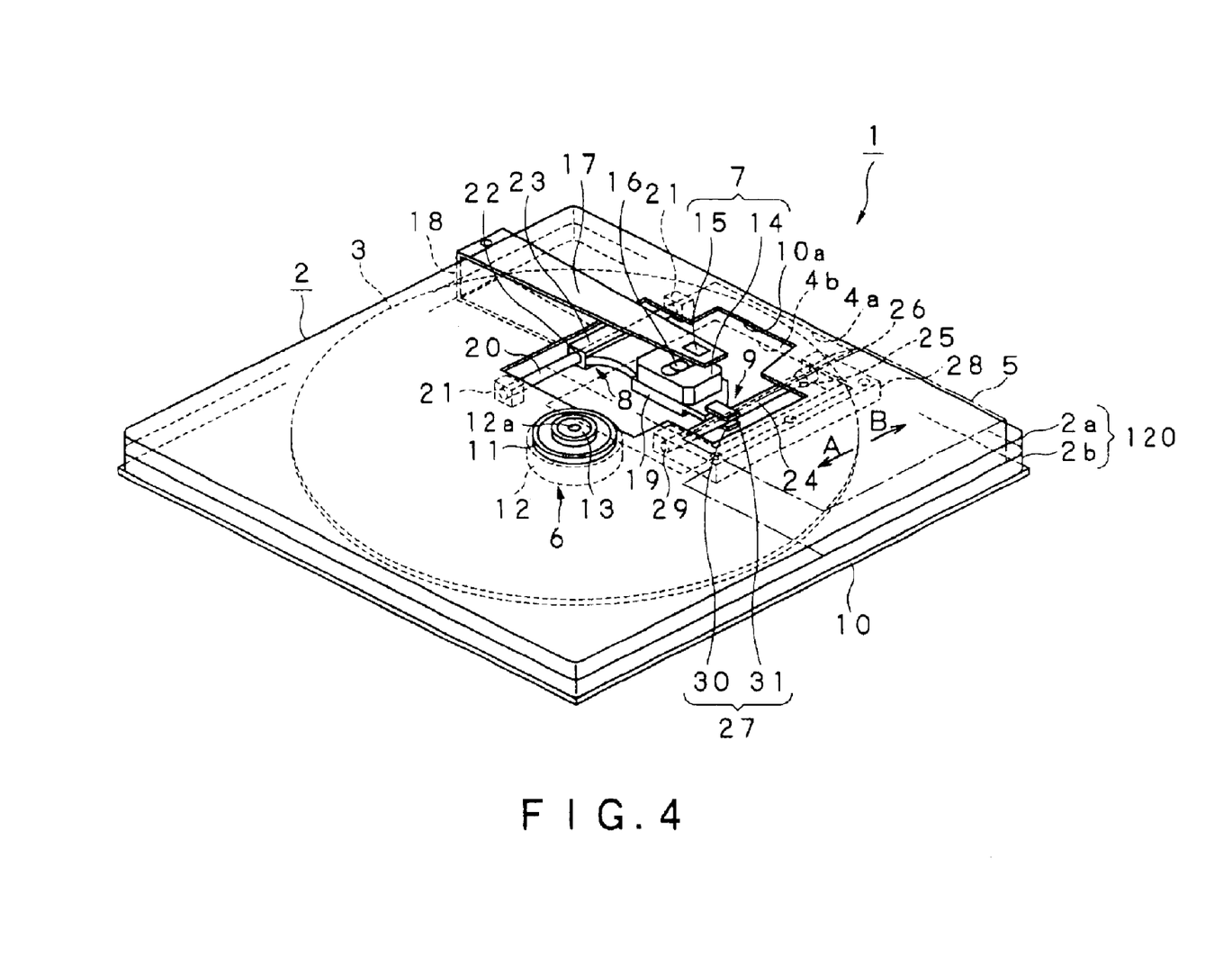
FIG. 4 shows a perspective view of the recording and/or reproducing apparatus according to the present invention.

FIG. 4 shows a recording and/or reproducing apparatus 1 employing the present invention, which uses a disc cartridge 2. The disc cartridge 2 has a cartridge body 120 which has a pair of an upper half 2a and a lower half 2b put together with their inner surfaces facing each other. The cartridge body 120 is so formed as to be able to rotatably house a magneto-optical disc 3 being 64 mm in diameter. The upper half 2a and the lower half 2b, configuring the upper and lower portions of the cartridge body 120, have openings 4a, 4b for exposing a part of the signal recording area of the magneto-optical disc 3 to the outside from the inner to the outer circumference thereof, respectively. The openings 4a, 4b, which are used for recording and reproducing operation, has its size so formed as to be able to allow an optical pickup 14 and a magnetic head 15, to be described later, to enter into the disc cartridge 2.

The cartridge body 120 has slidably mounted thereon a shutter 5 for covering and uncovering the openings 4a, 4b. The shutter 5 is made out of a flat plate, which is folded to form the shape substantially of the letter "U", and has its size so formed as to be able to cover the openings 4a, 4b. The shutter 5 is so held as to be able to slide along one edge of the disc cartridge 2 between a position to cover the openings 4a, 4b and that to uncover the openings 4a, 4b.

The magneto-optical disc 3, which is housed in the cartridge body 120, has a center hub made of metal, not shown, at its center portion. The lower half 2b has an opening, not shown, formed at substantially its center portion, for exposing the hub to the outside, which is used when driving the magneto-optical disc 3.

The recording and/or reproducing apparatus 1 according to the present invention has a main body, an openable cover which is mounted to the main body, a holder for holding the disc cartridge 2 between a placement/removal position where the cover is opened and the disc cartridge 2 is placed/removed onto/from the main body and a loading position where the cover is closed and the disc cartridge 2 is loaded to the main body, and a mechanism chassis or a mecha-chassis 10 for movably supporting the holder between the placement/removal position and the loading position, which are not shown except the mecha-chassis 10.

Being held by a holing portion of the holder, the disc cartridge 2 has the shutter 5 slid, which causes the openings 4a, 4b to be uncovered. Then, the disc cartridge 2, which is held by the holder, is caused to shift onto the mecha-chassis 10 of the main body when the cover is closed.

The main body includes a disc rotation drive mechanism 6 for driving or rotating the magneto-optical disc 3 housed in the disc cartridge 2, a recording and/or reproducing mechanism 7 for recording and reproducing information signals to and from the magneto-optical disc 3 driven by the disc rotation drive mechanism 6, a support mechanism 8 for movably supporting the recording and/or reproducing mechanism 7 along the radial direction of the magneto-optical disc 3, an impact drive mechanism 9 for shifting the recording and/or reproducing mechanism 7 supported by the support mechanism 8 along the radial direction of the magneto-optical disc magneto-optical disc 3, which are arranged on the mecha-chassis 10.

The disc rotation drive mechanism 6 has a disc table 11 onto which the magneto-optical disc 3 is placed, and a spindle motor 12 for driving or rotating the disc table 11. The disc table 11 has its center portion fixed to the rotation axis 12a of the spindle motor 12, and has a permanent magnet 13 for attracting the center hub of the magneto-optical disc 3 through the opening of the disc cartridge 2 at the main surface thereof facing the disc cartridge 2. The spindle motor 12 is arranged at substantially the center of the mecha-chassis 10, and drives the magneto-optical disc 3 chucked by the disc table 11.

The recording and/or reproducing mechanism 7 has an optical pickup 14 for irradiating an optical beam to one surface of the magneto-optical disc 3, a part of which is exposed to the outside through the opening of the disc cartridge 2 for recording and reproducing operation, and a magnetic head 15 for applying external magnetic field to the other surface of the magneto-optical disc 3, a part of which is also exposed to the outside through the opening of the disc cartridge 2 for recording and reproducing operation, at the time of recording operation, which is so arranged as to face the optical pickup 14.

The optical pickup 14 at least has a semiconductor laser, not shown, being a light source for emitting an optical beam to the magneto-optical disc 3, an optical block consisting of an objective lens 16 for condensing an optical beam emitted from the semiconductor laser and irradiating thus condensed optical beam to the signal recording surface of the magneto-optical disc 3 and a photodetector, not shown, for receiving a returning optical beam reflected by the signal recording surface of the magneto-optical disc 3, and a uniaxial actuator being an objective lens driving unit, not shown, for shifting the objective lens 16 along the focusing direction parallel to the optical axis of the objective lens 16 based on detection signals detected by the photodetector.

The magnetic head 15 is fixed at the end of a head fixing arm 17, such that the magnetic head 15 and the objective lens 16 of the optical pickup 14 faces each other with the magneto-optical disc 3 arranged therebetween. The head fixing arm 17 is made of elastically deformable material which is caused to approach or come into contact with the surface of the magneto-optical disc 3, opposite to the side facing the optical pickup 14, by a head elevating mechanism, not shown, only at the time of recoding operation.

Figure 5:
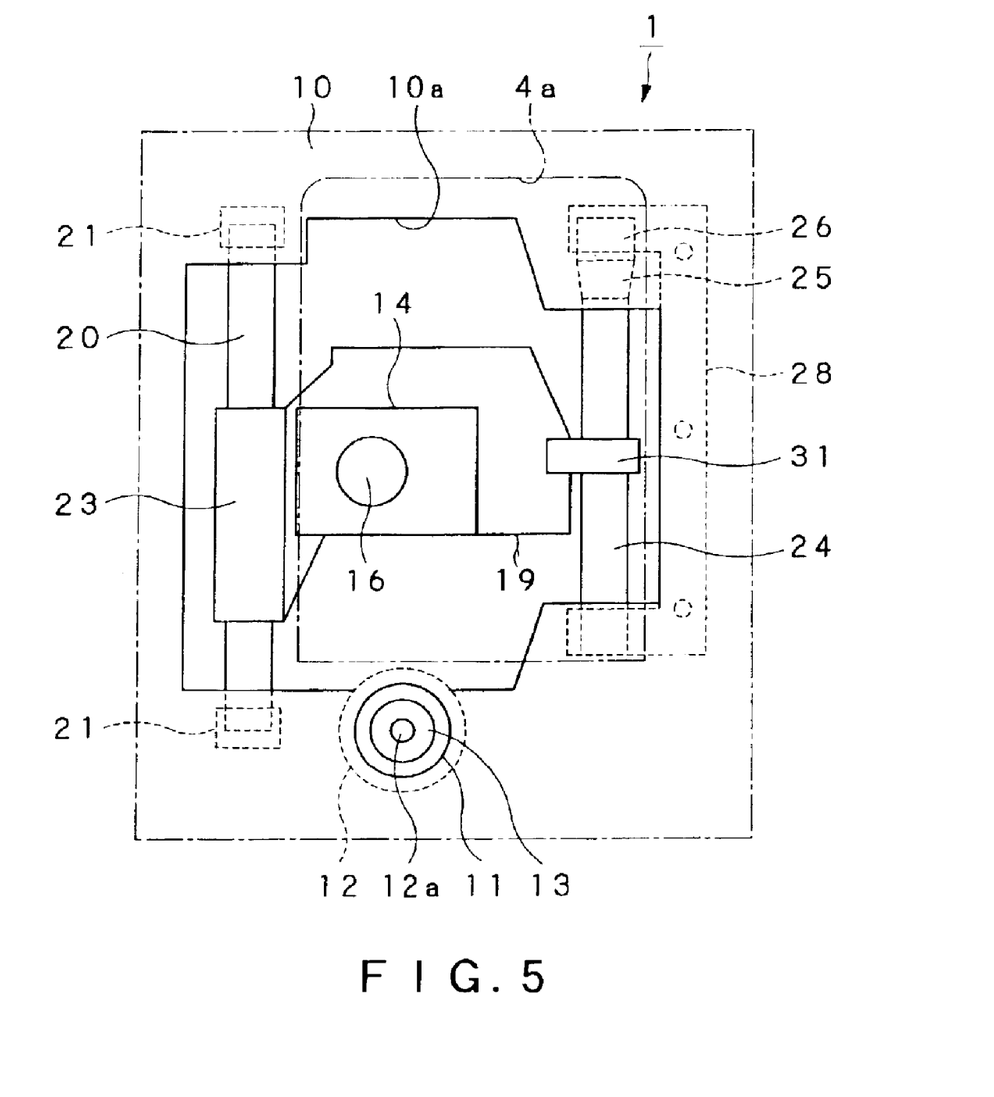
FIG. 5 shows a top view of the recording and/or reproducing apparatus according to the present invention.
Figure 6:
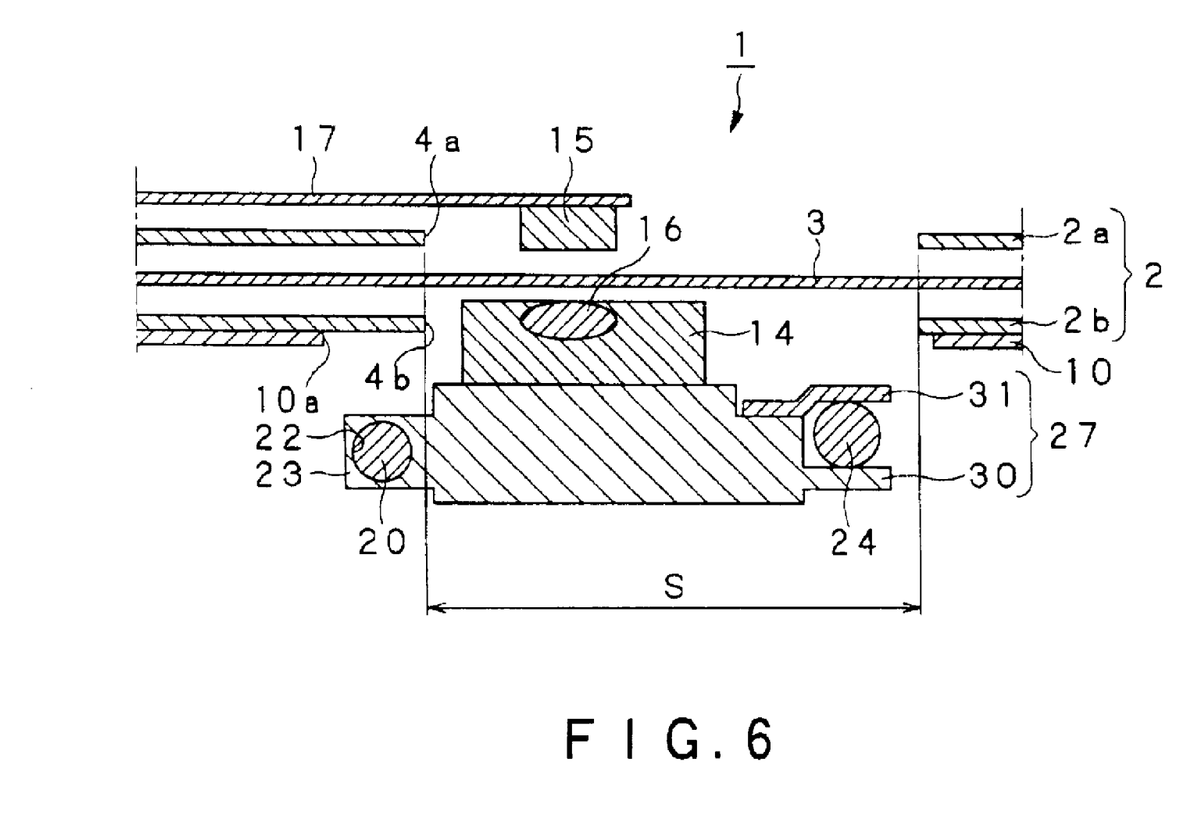
FIG. 6 shows a cross-sectional view of the recording and/or reproducing apparatus according to the present invention.

As shown in FIG. 5 and FIG. 6, the optical pickup 14 and the magnetic head 15 are arranged within a projection area "S" of the openings 4a, 4b which are used for recording and reproducing operation, that is, a projection area "S" which is formed by projecting the openings 4a, 4b along the direction perpendicular to the signal recording surface of the magneto-optical disc 3. Also, the mecha-chassis 10 is provided with an opening 10a corresponding to the openings 4a for recording and reproducing operation.

The support mechanism 8 has a support base 19 which supports the optical pickup 14 as well as the magnetic head 15 fixed at the end of the head fixing arm 17 via a linking arm 18, and a guide shaft 20 for movably supporting the support base 19 along the radial direction of the magneto-optical disc 3.

The support base 19 supports the optical pickup 14 such that the upper portion of the optical pickup 14 is exposed to the outside through the opening 10a of the mecha-chassis 10, while the guide shaft 20 is so arranged as to be parallel to the radial direction of the magneto-optical disc 3. Both ends of the guide shaft 20 are held and fixed by holding members 21, 21 which are arranged on the mecha-chassis 10 in the vicinity of the opening 10a. The support base 19 has a holding member 23 unitedly formed at one edge thereof, which is provided with a guide excavation 22 through which the guide shaft 20 is inserted.

The impact drive mechanism 9 has a drive shaft 24 which is so arranged as to be parallel to the guide shaft 20 or the radial direction of the magneto-optical disc 3, an electromechanical-transduction element 25 installed to one end of the drive shaft 24, a fixation portion 26 for fixing one end of the electromechanical-transduction element 25, and a movable portion 27 which is so held by the drive shaft 24 as to be able to slide along the shaft direction thereof.

The drive shaft 24 is of a length long enough to shift the support base 19 from the inner to the outer circumference of the magneto-optical disc 3, which has the electromechanical-transduction element 25 installed to one end thereof. The electromechanical-transduction element 25 is an element called a piezo element or a piezoelectric element which lengthens and shortens at different velocities, that is velocity at the time of lengthening and that at the time of shortening is different, along the shaft direction of the drive shaft 24 corresponding to driving pulses generated from a drive circuit, not shown. The fixation portion 26 is fixed to one end of the electromechanical-transduction element 25, different from the end which is installed to the drive shaft 24, as a balancer.

The impact drive mechanism 9 is supported by a bracket 28 which is arranged on the bottom side of the mecha-chassis 10 by means of screws, opposite to the side facing the disc cartridge 2. Specifically, the fixation portion 26 is fixed at one end of the bracket 28, while the other end of the drive shaft 24, not the fixation portion 26 side, is inserted through a shaft excavation 29 which is provided at the other end of the bracket 28. Thus, the drive shaft 24 is slidably held by the bracket 28 along the shaft direction hereof.

The movable portion 27 consists of a pair of a first support piece 30 and a second support piece 31 formed at the support base 19. The first support piece 30 is unitedly and protrusively formed at one edge of the support base 19, opposite to the side at which the holding member 23 is arranged. On the other hand, the second support piece 31 may be an elastically deformable member such as a leaf spring, which has its one end supported by the support base 19 by means of screws. The first support piece 30 and the second support piece 31 face each other, and have the drive shaft 24 held therebetween. Thus, the drive shaft 24 is slidably held by the first support piece 30 and the second support piece 31 along the shaft direction thereof.

Since the holding member 23 is held by the guide shaft 20 along the shaft direction thereof, while the movable portion 27 is held by the drive shaft 24 along the shaft direction thereof, the support base 19 is movably held by the guide shaft 20 and the drive shaft 24 along the shaft direction thereof or the radial direction of the magneto-optical disc 3.

The impact drive mechanism 9 causes the electromechanical-transduction element 25 to lengthen and shorten corresponding to driving pulses to shift the drive shaft 24 along the shaft direction thereof, which consequently causes the movable portion 27 to slide along the shaft direction of the drive shaft 24. Thus, the support base 19 can be linearly driven or shifted along the radial direction of the magneto-optical disc 3.

Figure 7A:
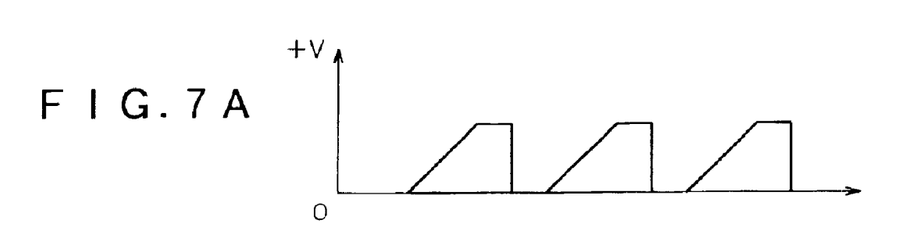

More specifically, when linearly driving or shifting the support base 19 along the direction of an arrow "A" shown in FIG. 4, the impact drive mechanism 9 applies a driving pulse of continuous pulse waves each has a gradual voltage rise and a steep voltage drop, as shown in FIG. 7A, to the electromechanical-transduction element 25. When the voltage gradually rises, the electromechanical-transduction element 25 gradually lengthens, while the drive shaft 24 gradually shifts along the "A" direction accordingly. At this time, the movable portion 27 shifts along the "A" direction together with the drive shaft 24 due to friction which works therebetween. On the other hand, when the voltage steeply drops, the electromechanical-transduction element 25 steeply shortens, while the drive shaft 24 steeply shifts along the direction of an arrow "B" shown in FIG. 4 accordingly. At this time, the movable portion 27 does not shift and only the drive shaft 24 shifts along the "B" direction since the movable portion 27 slips on the drive shaft 24. In result, after a gradual voltage rise and a steep voltage drop is applied, the movable portion 27 relatively shifts along the "A" direction against the drive shaft 24.

Accordingly, by applying the driving pulse of continuous pulse waves shown in FIG. 7A to the electromechanical-transduction element 25 to oscillate the drive shaft 24 along the shaft direction thereof, the impact drive mechanism 9 can slide the movable portion 27 along the "A" direction shown in FIG. 4 continuously against the drive shaft 24, and thus can shifts the support base 19 along the "A" direction.

Figure 7B:
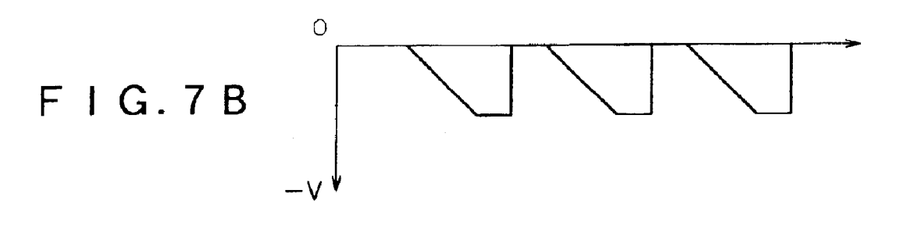
FIG. 7B shows a wave form used in shifting the support base along the "B" direction of FIG. 4.

On the other hand, when linearly driving or shifting the support base 19 along the "B" direction shown in FIG. 4, the impact drive mechanism 9 applies a driving pulse of continuous pulse waves each has a gradual voltage drop and a steep voltage rise, whose pulse wave form is opposite to that shown in FIG. 7A, as shown in FIG. 7B, to the electromechanical-transduction element 25. When the voltage gradually drops, the electromechanical-transduction element 25 gradually shortens, while the drive shaft 24 gradually shifts along the "B" direction accordingly. At this time, the movable portion 27 shifts along the "B" direction together with the drive shaft 24 due to friction which works therebetween. On the other hand, when the voltage steeply rises, the electromechanical-transduction element 25 steeply lengthens, while the drive shaft 24 steeply shifts along the "A" direction shown in FIG. 4 accordingly. At this time, the movable portion 27 does not shift and only the drive shaft 24 shifts along the "A" direction since the movable portion 27 slips on the drive shaft 24. In result, after a gradual voltage drop and a steep voltage rise is applied, the movable portion 27 relatively shifts along the "B" direction against the drive shaft 24.

Accordingly, by applying the driving pulse of continuous pulse waves shown in FIG. 7B to the electromechanical-transduction element 25 to oscillate the drive shaft 24 along the shaft direction thereof, the impact drive mechanism 9 can slide the movable portion 27 along the "B" direction shown in FIG. 4 continuously against the drive shaft 24, and thus can shifts the support base 19 along the "B" direction. Also, even though the electromechanical-transduction element 25 is not driven, the impact drive mechanism 9 can cause the support base 19 to stay at arbitrary positions along the movement direction with stability due to friction which works between the drive shaft 24 and the movable portion 27 by adjusting elastic force of the second support piece 31 against the drive shaft 24. Moreover, the impact drive mechanism 9 is free from backlash, and can perform driving control with high resolution of the order of nm as well as soundless driving control at the ultrasonic region of more than 20 kHz. Furthermore, the impact drive mechanism 9 can be significantly reduced in size as compared with the conventional drive mechanism in which rotational driving force is converted to linear driving force by means of a gear group and a lead screw, as shown in FIG. 5 and FIG. 6, and can be arranged within the projection area "S" of the openings 4a, 4b, used for recording and reproducing operation, of the disc cartridge 2 together with the recording and/or reproducing mechanism 7.

Figure 8:
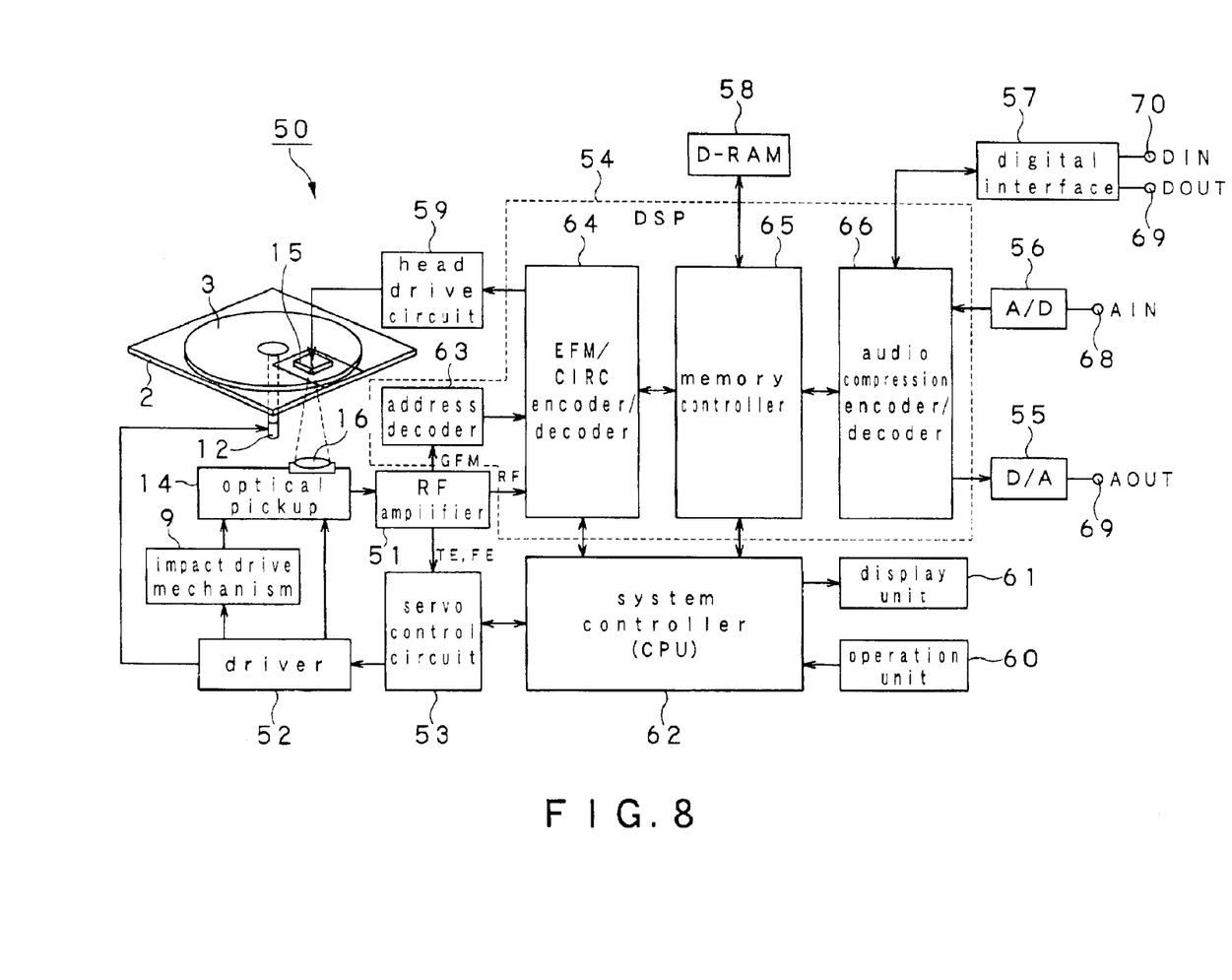
FIG. 8 shows a block diagram of a control unit of the recording and/or reproducing apparatus according to the present invention.

FIG. 8 shows a block diagram of a control unit 50 of the recording and/or reproducing apparatus 1 employing the present invention.

The control unit 50 includes an RF amplifier 51 for generating various signals, a servo control circuit 53 for performing driving control of various units via a driver 52, a digital signal processor (referred to as DSP, hereinafter) 54, a D/A converter 55 for converting digital signals to analog signals, an A/D converter 56 for converting analog signals to digital signals, a digital interface 57 for outputting and receiving digital signals, a buffer memory 58 which may be a D-RAM (Dynamic Random Access Memory), a head drive circuit 59 for driving or controlling the magnetic head 15, an operation unit 60 which is used by the user in operating the system, a display unit 61 for displaying information to the user, and a system controller 62 which may be a microcomputer (CPU) for controlling the whole system.

The RF amplifier 51 performs predetermined operations for detection signals of the magneto-optical disc 3 detected by the optical pickup 14 at the time of reproducing operation to generate reproduction signals RF, tracking error signals TE, focusing error signals FE, etc., and extracts groove information GFM being absolute position information recorded to the magneto-optical disc 3 as wobbling grooves.

The servo control circuit 53 drives or controls the impact drive mechanism 9, spindle motor 12, optical pickup 14, etc. based on the focusing error signals FE and tracking error signals TE sent from the RF amplifier 51, and track jump commands, access commands, etc. sent from the system controller 62. Specifically, the servo control circuit 53 detects error against target values along the focusing direction using the focusing error signals FE supplied from the RF amplifier 51, and sends control signals to the driver 52 based on the detection results. Then, the driver 52 applies drive voltage corresponding to the control signals to the uniaxial actuator of the optical pickup 14 to shift the objective lens 16 along the focusing direction. Thus, the focusing operation of bringing a focal point of the objective lens 16 to the signal recording surface of the magneto-optical disc 3 is performed. Also, the servo control circuit 53 detects error against target values along the tracking direction using the tracking error signals TE supplied from the RF amplifier 51, and sends control signals to the driver 52 based on the detection results. Then, the driver 52 applies drive voltage corresponding to the control signals to the impact drive mechanism 9 to shift the support base 19 along the radial direction of the magneto-optical disc 3. Thus, the tracking operation of bringing a beam spot of an optical beam condensed by the objective lens 16 to recording tracks of the magneto-optical disc 3 is performed.

The servo control circuit 53 generates control signals based on the tracking error signals TE sent from the RF amplifier 51, and track jump commands and access commands sent from the system controller 62, and then sends the control signals to the driver 52. The driver 52 applies driving pulses corresponding to the control signals to the impact drive mechanism 9 to shift the support base 19 along the radial direction of the magneto-optical disc 3. Thus, the recording and/or reproducing mechanism 7 is caused to shift from the inner to the outer circumference of the magneto-optical disc 3.

Furthermore, the servo control circuit 53 drives the spindle motor 12 at a constant linear velocity using the driver 52 and sends control signals based on commands from the system controller 62 to the driver 52 so as to drive, or start and stop, the spindle motor 12. Also, the servo control circuit 53 sends control signals based on commands from the system controller 62 to the driver 52 so as to turn on and turn off the semiconductor laser of the optical pickup 14 and adjust the laser power.

The DSP 54 has an address decoder 63 to which groove information GFM is sent from the RF amplifier 51, and the address decoder 63 decodes the groove information GFM sent from the RF amplifier 51 to extract address information. This address information is sent to the system controller 62, and is used for various driving and controlling. The DSP 54 further has an EFM/CIRC encoder/decoder 64, a vibration-proof memory controller 65, and an audio compression encoder/decoder 66. At the time of reproducing operation, the EFM/CIRC encoder/decoder 64 receives reproduction signals RF from the RF amplifier 51, and performs EFM (Eight to Fourteen Modulation) modulation and decoding operation of CIRC (Cross Interleave Reed-Solomon Code), etc. related to error correction for the reproduction signals RF. Thus, compressed data signals are extracted, and the extracted data signals are written to the buffer memory 58 by the vibration-proof memory controller 65. Data signals, which has been written to the buffer memory 58, are read out every predetermined data unit, and are sent to the audio compression encoder/decoder 66. Then, the data signals undergo decoding processing by the ATRAC (Adaptive Transform Acoustic Coding). Thus, the compressed data signals are decompressed to be digital audio signals. Thus generated digital audio signals are converted to analog audio signals by the D/A converter 55, and are output from an audio output terminal 67. The digital audio signals may be output directly from a digital output terminal 69 via the digital interface 57.

On the other hand, at the time of recording operation, analog audio signals received from an audio input terminal 68 are sent to the audio compression encoder/decoder 66 after being converted to digital audio signals by the A/D converter 56. The recording and/or reproducing apparatus 1 can receive digital audio signals directly from a digital input terminal 70 via the digital interface 57.

In the DSP 54, digital audio signals sent to the audio compression encoder/decoder 66 are encoded by the ATRAC to be compressed data signals, and are then written to the buffer memory 58 by the vibration-proof memory controller 65. Then, data signals, which has been written to the buffer memory 58, are read out every predetermined data unit, and are sent to the EFM/CIRC encoder/decoder 64. Then, the data signals undergo the EFM modulation and encoding processing of CIRC, etc. related to error correction, and are sent to the head drive circuit 59.

The head drive circuit 59 causes the magnetic head 15 to generate external magnetic field which is modulated in accordance with thus encoded data signals. At this time, the head elevating mechanism causes the magnetic head 15 to approach or come into contact with the surface of the magneto-optical disc 3, opposite to the side facing the optical pickup 14, based on commands from the system controller 62. Also, the servo control circuit 53 drives the optical pickup 14 via the driver 52 based on commands from the system controller 62 so that the semiconductor laser emits an optical beam to the signal recording surface of the magneto-optical disc 3, which optical beam raise the temperature of beam exposure portion more than the Curie temperature. Thus, compressed digital signals are recorded to the magneto-optical disc 3.

The operation unit 60 consists of operation switches and operations buttons, and send operation information concerning recording and reproduction operation such as reproduction, recording, pause, stop, fast wind, fast rewind, head search, etc. and operation information concerning play mode such as normal reproduction, program reproduction, shuffle reproduction, etc. to the system controller 62.

The display unit 61 may be such as a liquid display panel which displays operation mode state of the magneto-optical disc 3, track number, recording or reproducing time, editing operation state, etc. at the time of recording and reproducing operation.

The system controller 62 controls the operation of respective units corresponding to the operation information sent from the operation unit 60, and causes the display unit 61 to display information.

According to thus configured recording and/or reproducing apparatus 1, using the above-described impact drive mechanism 9, the number of parts as well as the size and weight can be significantly reduced as compared with the conventional drive mechanism in which rotational driving force is converted to linear driving force by means of a gear group and a lead screw using a drive motor, which can reduce the size and weight of the apparatus.

According to the recording and/or reproducing apparatus 1 employing the present invention, since the recording and/or reproducing mechanism 7 and the impact drive mechanism 9 are arranged within the projection area "S" of the openings 4a, 4b for recording and reproducing operation of the disc cartridge 2, part of the recording and/or reproducing mechanism 7 and the impact drive mechanism 9 can be arranged within the disc cartridge 2 via the openings 4a, 4b for recording and reproducing operation. That is, in the recording and/or reproducing apparatus 1, the optical pickup 14 having thickness and the impact drive mechanism 9 significantly reduced in size can be arranged within the disc cartridge 2 via the openings 4b of the lower half 2b. Thus, the recording and/or reproducing apparatus 1 can further be reduced in thickness and size, and especially, the thickness of the apparatus can be reduced significantly.

According to the recording and/or reproducing apparatus 1 employing the present invention, since the guide shaft 20 is not required to be screwed, the guide shaft 20 can be formed slenderly. Thus, the guide shaft 20 also can be arranged within the projection area "S" of the openings 4a, 4b for recording and reproducing operation of the disc cartridge 2, which can further reduce the recording and/or reproducing apparatus 1 in size. Furthermore, since the impact drive mechanism 9 can perform the shift operation and the tracking operation, the optical pickup 14 has to perform only focusing operation for the objective lens 16 using the uniaxial actuator, the configuration of the optical pickup 14 can be simplified significantly.

According to the recording and/or reproducing apparatus 1 employing the present invention, since it is not necessary to correct detection signals in view of the offset due to the swinging of the objective lens 16, tracking servo control by one spot optical system can be easily employed. Thus, in the recording and/or reproducing apparatus 1, the configuration for performing the tracking operation can be simplified, which improves the credibility significantly.

According to the recording and/or reproducing apparatus 1 employing the present invention, the number of parts and the number of steps in the assembling process are significantly reduced, which can reduce manufacturing cost tremendously. Thus, power consumption can be lowered, which can prolong the life cycle of a battery.

The present invention is not restricted to the case employing such as the recording and/or reproducing apparatus 1 in which information signals are recorded/reproduced to/from the magneto-optical disc 3 rotatably housed in the disc cartridge 2, and can be widely applicable to the case employing a recording and/or reproducing apparatus in which information signals are recorded/reproduced to/from an optical disc such as a CD (Compact Disc), a CD-R (CD-Recordable), a CD-RW (CD-ReWritable), and a DVD (Digital Versatile Disc).

Furthermore, the present invention can be applicable to a reproducing apparatus using a read-only type optical disc.

INDUSTRIAL APPLICABILITY

As in the above, in thus configured recording and/or reproducing apparatus according to the present invention, using the impact drive mechanism, the number of parts as well as the size and weight can be significantly reduced as compared with the conventional drive mechanism in which rotational driving force is converted to linear driving force by means of a gear group and a lead screw using a drive motor.

Furthermore, in the recording and/or reproducing apparatus, part of the recording and/or reproducing mechanism and the impact drive mechanism can be arranged within the disc cartridge via the openings, which can reduce the size and weight of the apparatus.

What is claimed is:

1. A reproducing apparatus, comprising:
   a reproduction means for reproducing signals recorded on a disc recording medium which is rotatably housed in a disc cartridge;

a support means for movably supporting the reproduction means along a radial direction of the disc recording medium, the support means having a support base which supports the reproduction means; and a drive means having a movable portion arranged at the support base, a drive shaft for slidably supporting the movable portion along the radial direction of the disc recording medium, and an electromechanical-transduction element installed to one end of the drive shaft, which lengthens and shortens along a shaft direction of the drive shaft corresponding to driving pulses, the drive means causing the electromechanical-transduction element to lengthen and shorten corresponding to the driving pulses to shift the drive shaft along the shaft direction thereof so as to cause the movable portion to slide along the shaft direction of the drive shaft;

wherein the reproduction means and the electromechanical-transduction element of the drive means are arranged within a projection area of openings of the disc cartridge for exposing a part of the disc recording medium to an outside from an inner to an outer circumference thereof.

2. The reproducing apparatus as set forth in claim 1, wherein the movable portion comprises a pair of support pieces for holding the drive shaft, and either of the support pieces is elastically deformable.

3. The reproducing apparatus as set forth in claim 1, wherein the reproduction means has an optical pickup for irradiating an optical beam to the disc recording medium, and the drive means performs the shift operation of shifting the optical pickup from the inner to the outer circumference of the disc recording medium, and the tracking operation of bringing a beam spot of an optical beam irradiated by the optical pickup to recording tracks of the disc recording medium.

4. The reproducing apparatus as set forth in claim 3, wherein the optical pickup has at least a light source for emitting an optical beam, an objective lens for condensing an optical beam emitted from the light source and irradiating thus condensed optical beam to the signal recording surface of the disc recording medium, a photo detection means for detecting a returning optical beam reflected by the signal recording surface of the disc recording medium, and an objective lens drive means for shifting the objective lens along the optical axis thereof based on detection signals detected by the photo detection means.

5. The reproducing apparatus as set forth in claim 3, wherein the reproduction means has a magnetic head for applying external magnetic field to the disc recording medium, which is so arranged as to face the optical pickup.

6. A recording and/or reproducing apparatus, comprising:

a record and reproduction means for recording/reproducing signals to/from a disc recording medium which is rotatably housed in a disc cartridge;

a support means for movably supporting the record and reproduction means along a radial direction of the disc recording medium, the support means having a support base which supports the record and reproduction means; and a drive means having a movable portion arranged at the support base, a drive shaft for slidably supporting the movable portion along the radial direction of the disc recording medium, and an electromechanical-transduction element installed to one end of the drive shaft, which lengthens and shortens along a shaft direction of the drive shaft corresponding to driving pulses, the drive means causing the electromechanical-transduction element to lengthen and shorten corresponding to the driving pulses to shift the drive shaft along the shaft direction thereof so as to cause the movable portion to slide along the shaft direction of the drive shaft;

wherein the record and reproduction means and the electromechanical-transduction element of the drive means are arranged within a projection area of openings of the disc cartridge for exposing a part of the disc recording medium to an outside from an inner to an outer circumference thereof.

7. The recording and/or reproducing apparatus as set forth in claim 6, wherein the movable portion comprises a pair of support pieces for holding the drive shaft, and either of the support pieces is elastically deformable.

8. The recording and/or reproducing apparatus as set forth in claim 6, wherein the record and reproduction means has an optical pickup for irradiating an optical beam to the disc recording medium, and the drive means performs the shift operation of shifting the optical pickup from the inner to the outer circumference of the disc recording medium, and the tracking operation of bringing a beam spot of an optical beam irradiated by the optical pickup to recording tracks of the disc recording medium.

9. The recording and/or reproducing apparatus as set forth in claim 8, wherein the optical pickup has at least a light source for emitting an optical beam, an objective lens for condensing an optical beam emitted from the light source and irradiating thus condensed optical beam to the signal recording surface of the disc recording medium, a photo detection means for detecting a returning optical beam reflected by the signal recording surface of the disc recording medium, and an objective lens drive means for shifting the objective lens along the optical axis thereof based on detection signals detected by the photo detection means.

10. The recording and/or reproducing apparatus as set forth in claim 8, wherein the record and reproduction means has a magnetic head for applying external magnetic field to the disc recording medium, which is so arranged as to face the optical pickup.

11. A reproducing apparatus which has loaded thereto a disc cartridge for housing a disc recording medium, which is provided with openings for exposing at least a part of the disc recording medium to an outside from an inner to an outer circumference thereof, and reproduces data recorded on the disc recording medium via the openings of the disc cartridge, the reproducing apparatus comprising:

a reproduction means which has a read out means for reading out data recorded on the disc recording medium housed in the disc cartridge, and a drive means for shifting the read out means to predetermined positions against the disc recording medium, the drive means comprising an electromechanical-transduction element configured to lengthen and shorten to shift the reproduction means;

wherein the reproduction means and the electromechanical-transduction element are disposed within a projection area of the openings of the disc cartridge.

12. The reproducing apparatus as set forth in claim 11, wherein the drive means has a drive shaft means engaged with the read out means by friction, and an oscillation means for shifting the drive shaft means along the movement direction of the read out means.

13. The reproducing apparatus as set forth in claim 12, wherein the oscillation means oscillates so that the velocity of the drive shaft means along one direction is different from that along the other direction.

14. The reproducing apparatus as set forth in claim 11, wherein the read out means is an optical pickup which has an irradiation means for irradiating an optical beam to the disc recording medium to read out data recorded on the disc recording medium, and a photo detection means for detecting a returning optical beam reflected by the signal recording surface of the disc recording medium.

* * * * *